Jan. 12, 1960 D. G. SHEARER 2,920,526
METHOD AND APPARATUS FOR CO-ORDINATED STEPS IN
PHOTOGRAPHING AND EXHIBITING MOTION PICTURES
Filed Oct. 24, 1955 6 Sheets-Sheet 1
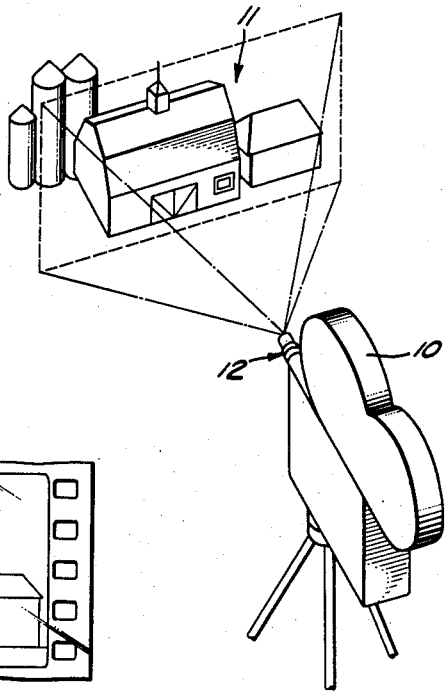
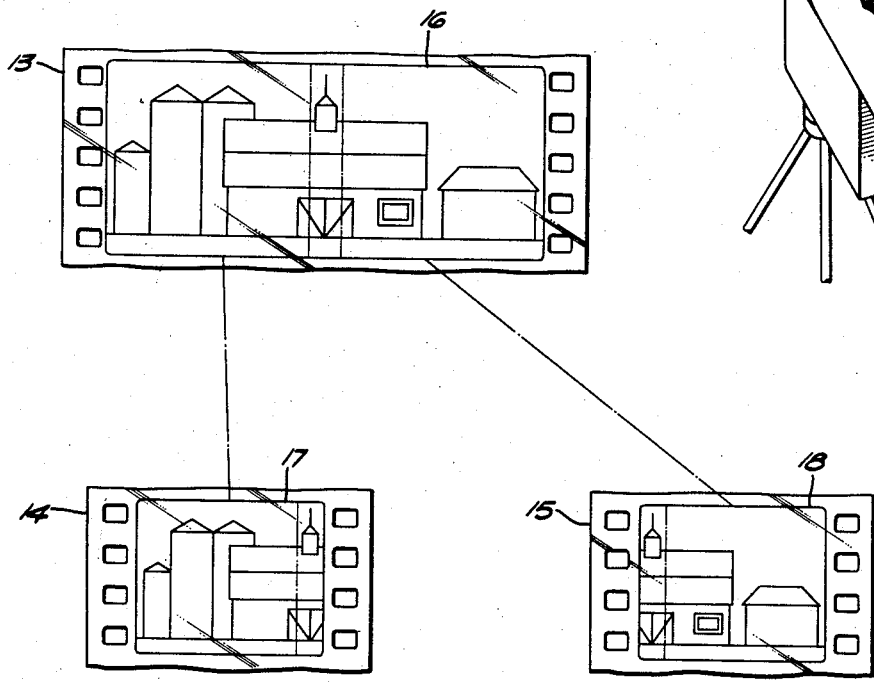
DOUGLAS G. SHEARER
INVENTOR.
BY 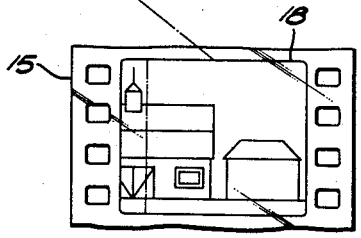
ATTORNEYS

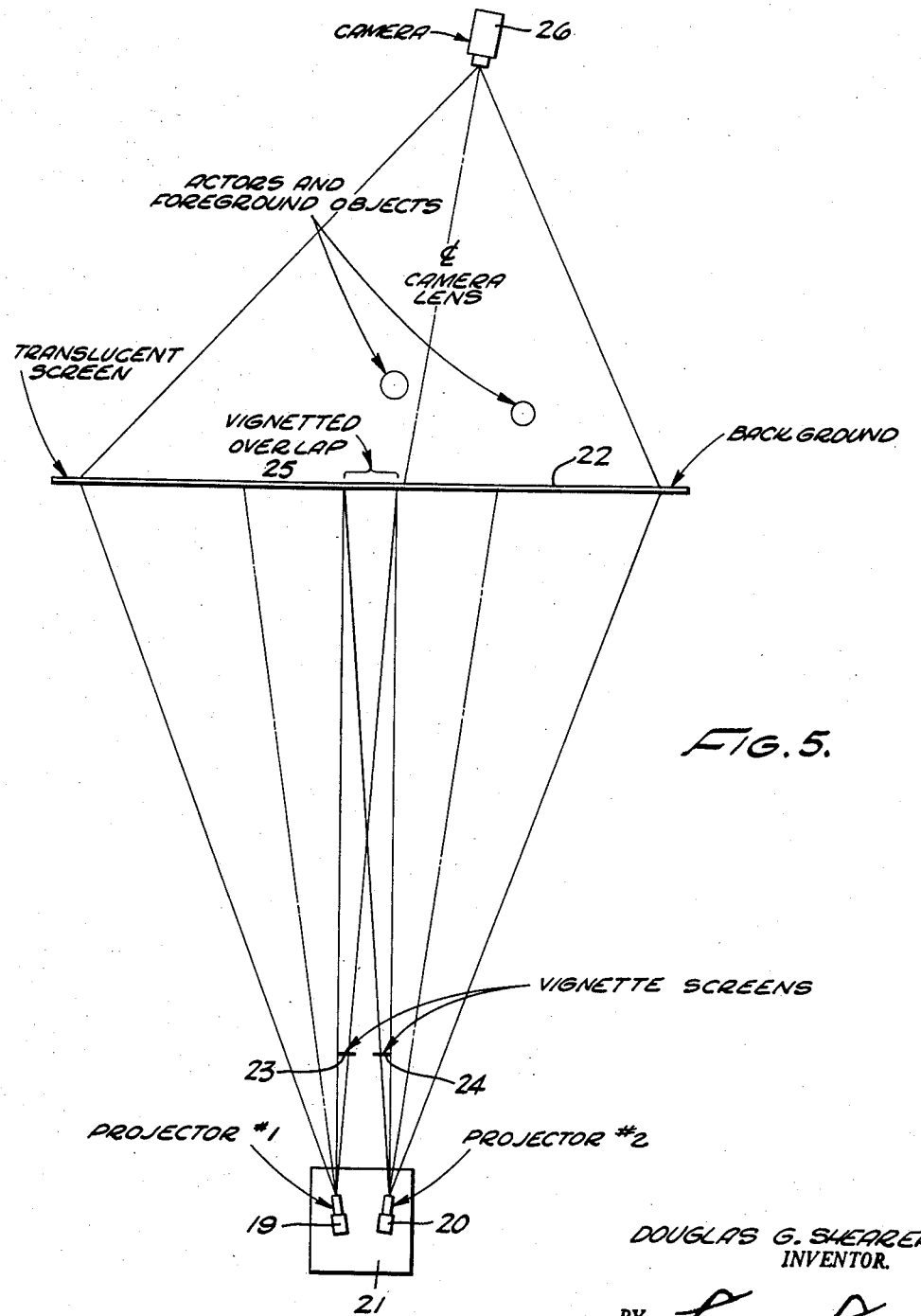

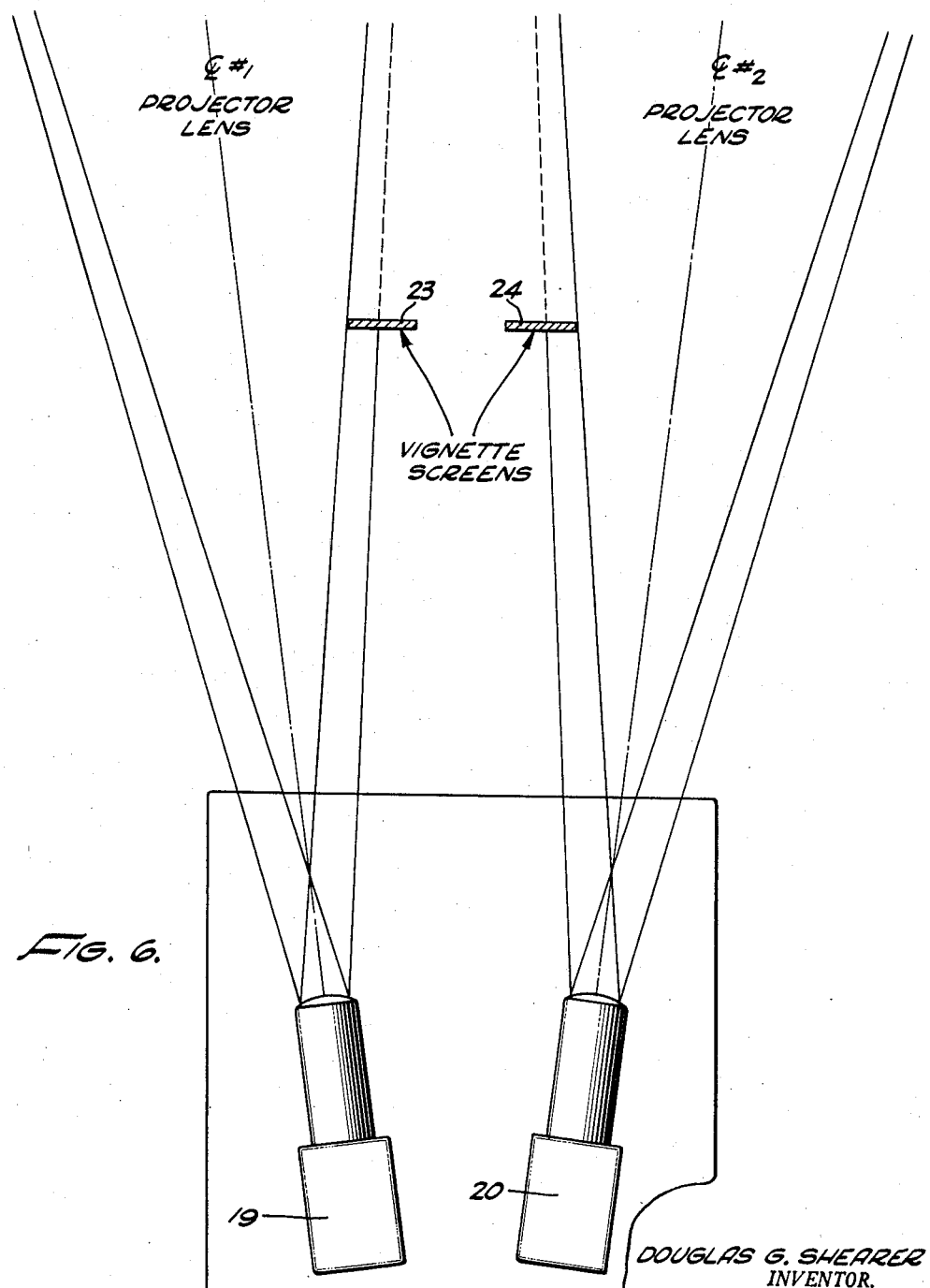

Jan. 12, 1960 D. G. SHEARER 2,920,526
METHOD AND APPARATUS FOR CO-ORDINATED STEPS IN
PHOTOGRAPHING AND EXHIBITING MOTION PICTURES
Filed Oct. 24, 1955 6 Sheets-Sheet 4

DOUGLAS G. SHEARER
INVENTOR.

BY Lyon & Lyon
ATTORNEYS

Jan. 12, 1960  D. G. SHEARER  2,920,526
METHOD AND APPARATUS FOR CO-ORDINATED STEPS IN
PHOTOGRAPHING AND EXHIBITING MOTION PICTURES
Filed Oct. 24, 1955  6 Sheets-Sheet 6

DOUGLAS G. SHEARER
INVENTOR.

BY Lyon+Lyon

ATTORNEYS

United States Patent Office 2,920,526
Patented Jan. 12, 1960

2,920,526

METHOD AND APPARATUS FOR CO-ORDINATED STEPS IN PHOTOGRAPHING AND EXHIBITING MOTION PICTURES

Douglas G. Shearer, Los Angeles, Calif., assignor to Loew's Incorporated, Culver City, Calif., a corporation of Delaware Application October 24, 1955, Serial No. 542,252

6 Claims. (Cl. 88—16.6)

This invention relates to photographing and exhibiting motion pictures. It is particularly directed to method and apparatus for making a single negative, deriving two or more prints from essentially different lateral portions of the negative, but with overlapping subject matter, simultaneously projecting the prints and combining the projected motion pictures adjacent each other horizontally with a degree of overlap, and blending them together, so that the resultant combination produces a single picture both visually and photographically, and without any noticeable line or zone of merging.

Present day motion picture screens having length-to-height ratios such as 2:1 or greater impose requirements on the projection system which are difficult to meet. In general practice, the area of such screens is so great and the shape is so elongated that the problem of providing sufficient screen illumination becomes acute. One proposed solution is to use wider than standard release prints, such as, for example, 65 mm., instead of the usual 35 mm. width. This solution is not entirely satisfactory, however. A change in shape of the film frame to make it more elongated not only increases the film frame area but disproportionately increases the amount of light required. The amount of light required from the condensing lens in the projector lamp increases as the square of the length of the diagonal of the film frame in order to maintain the same unit brilliance over the film frame area. The change to a more elongated shape plus the change in film frame area results in the requirement of a projection lamp of tremendously high capacity.

It is the principal object of my invention to provide a co-ordinated photographic and projection system involving a method and apparatus which overcomes this difficulty and greatly increases the amount of light upon the screen.

Another object is to provide in such a system a plurality of interlocked projectors operating in synchronism frame-for-frame and each projecting a portion of a single picture on a common screen, together with means for blending the portions together without any noticeable line or zone of merging.

Another object is to provide method and apparatus of this type in which the positive prints used in the projectors are derived from a single negative strip produced by a camera having a lens system with a single nodal point.

Another object is to employ this method and apparatus for background projection work upon a translucent screen. In this type of work the actors and the foreground objects are placed between the camera and the translucent screen, while the image on the screen is supplied by projecting a picture through the screen from the opposite side thereof. Adequate lighting on a large translucent screen of this type is very difficult to obtain because, at best, only about one-half of the light takes part in the production of the useful image. Furthermore, conventional techniques using a single projector for this purpose produce an objectionable "hot spot" or zone of contrasting brightness at the center of the picture, relative to the sides of the picture. My improved method and apparatus makes it possible to obtain adequate illumination while minimizing the effect of the objectionable "hot spot."

Other, more detailed, and related objects and advantages will appear hereinafter.

In the drawings:

Figure 1 is a perspective view in the idealized form showing a motion picture camera and a scene being photographed. The camera uses a single film strip exposed through a single lens system having a common nodal point.

Figure 2 is a diagrammatic illustration showing a single frame and picture on the negative film strip produced by the camera.

Figures 3 and 4 show single frames and portions of the picture on positive film strips derived from the frame shown in Figure 2.

Figure 5 is a diagrammatic illustration showing a preferred embodiment of my invention and showing a plurality of projectors producing a single picture on a translucent screen for background projection work.

Figure 6 shows a portion of Figure 5 on an enlarged scale.

Figure 7:
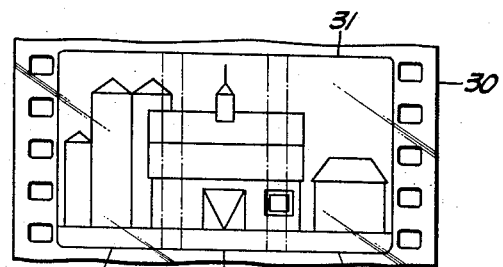
Figure 7 is a diagrammatic illustration showing a modified form of frame and picture on the negative strip produced by the camera.
Figure 8:
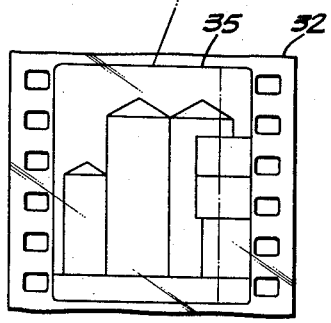
Figures 8, 9 and 10 show single frames and portions of the pictures on positive film strips derived from the frame shown in Figure 7.
Figure 9:
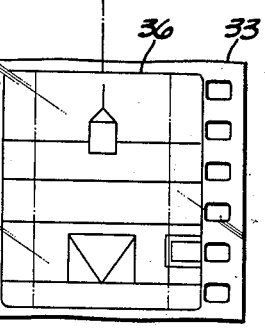
Figure 10:
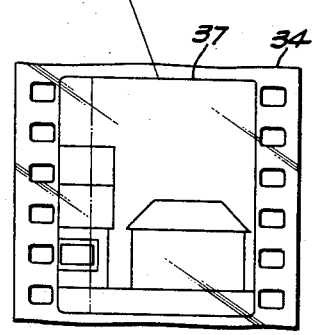
Figure 11:
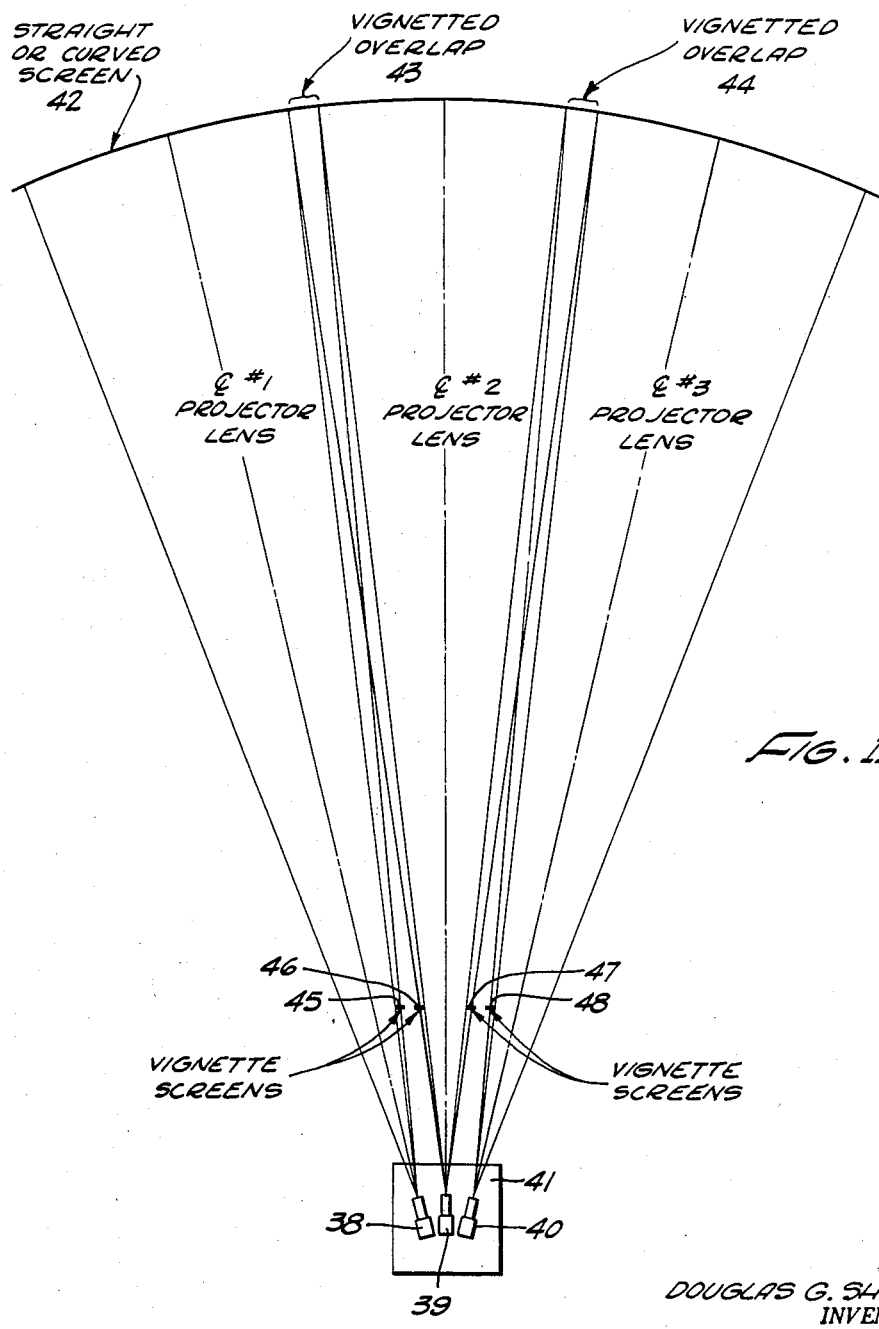
Figure 11 is a diagrammatic illustration showing a modification of my invention in connection with a plurality of projectors using positive film strips as shown in Figures 8, 9 and 10 for producing a single picture upon a viewing screen.

Referring to the drawings:

The motion picture camera 10 is used to photograph any desired scene generally designated 11 through a lens system 12 having a single nodal point. The width of the negative film strip 13, which is exposed in the camera, may be greater than standard and, as an example, may be 65 mm. wide. The negative film strip 13 is then utilized to print a plurality of 35 mm. positive film strips 14 and 15, each frame of the positive film strips containing an image which comprises only a portion of the image on the corresponding frame of the negative film strip 13. As shown in Figures 3 and 4, the picture portions on the positive film strips 14 and 15 each comprise a part of the total picture 16 on the corresponding frame of the negative film strip 13. It will be observed that the information contained along the right hand edge of the frame 17 duplicates the information contained on the left hand edge of the frame 18. The magnitude of this overlap is preferably from 5% to 7% of the width of each frame. As shown in the drawings, the height of the positive film frames may be less than the height of the corresponding negative film frame, with the result that the image height dimensions are less on the positive film frames.

The positive film strips 14 and 15 are run through projectors 19 and 20 operating in synchronism, frame for frame, so that the image being projected at any instant from each positive frame has been derived from the same negative frame. The synchronous operation of projectors may be obtained by mechanical interconnection or preferably through the use of Selsyn motors, as will be readily understood. If desired, the projectors may all be contained within the same enclosure 21. The image projected from each fills a portion of the translucent screen 22. The projectors 19 and 20 are oriented so that their projected images geometrically overlap in registry on the translucent screen 22.

The vignette screen 23 intercepts light along the right hand edge of the beam from projector 19 and the vignette screen 24 intercepts light projected along the left hand edge of the beam from projector 20. The purpose of these vignette screens is to effect blending and merging of the mosaic elements along the overlap zone 25 to form an integral picture filling the entire screen 22, with a minimum of visible evidence of the margins of the mosaic components in the total picture. By the nature of this arrangement, the light intensity does not vary markedly from one side of the overlap zone 25 to the other.

While I have shown and described the use of two projectors in my invention, it will be understood that three or more projectors may be employed, thereby requiring three or more vignette screens. If a larger viewing screen 22 is desired, the prints are made so that three or more projectors may be used simultaneously. If desired, vignette screens 23 and 24 could be combined into a single screen. I prefer to use separate screens, however, for ease of adjustment of position.

A camera 26 may be placed at any suitable location to use the picture on the translucent screen 22 as background. The lens axis of the camera may be normal to the screen 22 or may be placed at an angle thereto as illustrated in Figure 5. The projectors 19 and 20 and the camera 26 are operated in synchronism, frame for frame, so that the image being projected from each positive frame has been derived from the same negative frame. The actors and foreground objects are positioned between the camera 26 and the screen. If the background picture is not required to depict any motion, "still" pictures of relatively large size, for example 4" x 5", are projected with marginal edges overlapping and vignetted. The vignette screens serve to blend the overlap zones as described above. The objectionable "hot spot" which often appears at the center of the translucent screen when a single background projector is used is minimized to the extent that it is no longer a critical problem. The entire light level is raised and the objectionable contrast between the center of the screen and the edges thereof is almost entirely eliminated.

In the modified form of my invention shown in Figures 7-11, the negative strip 30 is exposed in the camera, using an anamorphic lens system having a single nodal point. In each frame 31 on the negative strip 30, the image width dimensions are compressed with respect to the image height dimensions. The width of the negative film strip 30 may be greater than the standard width of 35 mm. and the three 35 mm. positive film strips 32, 33, and 34 are derived from it. The images on these positive film strips each comprise a portion of the total image of the corresponding frame 31 on the negative film strip 30. The images on the positive film strips 32, 33, and 34 may remain anamorphosed to the same extent as the frame 31 or, preferably, are re-expanded in the printer or otherwise so that the height-to-width ratio of the contained image is restored to normal. As shown in the drawings, the height of the positive film frames may be greater than the height of the corresponding negative film frame, with the result that the image height dimensions are greater on the positive film frames.

It will be observed that the information contained along the right hand edge of the frame 35 duplicates the information contained along the left hand edge of the frame 36. Similarly, the information on the right hand edge of frame 36 duplicates that on the left hand edge of frame 37. The magnitude of this overlap in each case is preferably from 5% to 7% of the width of each frame.

The positive film strips 32, 33, and 34 are run through projectors 38, 39, and 40 operating in synchronism, frame for frame, as described above. The projectors may be placed within a common enclosure 41, or may be spaced apart in any desired positions. The image projected from each fills a portion of the straight or curved reflecting screen 42, and the projected images geometrically overlap in registry on the screen 42 to form overlap zones 43 and 44. The vignette screens 45, 46, 47, and 48 intercept light from each projector, in a manner similar to that illustrated in Figure 6, to effect blending and merging in the overlap zones 43 and 44 to form an integral picture filling the entire screen 42, with a minimum of evidence of the margins.

While I have shown and described three projectors, it will be understood that only two may be employed, thereby requiring only one vignette screen. If a wider viewing screen is to be used, the prints are made so that four or more projectors may be used simultaneously. If desired, vignette screens 45 and 46 could be combined into a single screen, and vignette screens 47 and 48 could similarly be combined. However, I prefer to use separate vignette screens, as shown, for ease of adjustment of position.

If the images on the positive film strips 32, 33 and 34 remain anamorphosed to the same extent as the corresponding images on the negative film strip 30, or if the positive images are anamorphosed but to a greater or lesser extent than the negative images, then the projectors 38, 39 and 40 are equipped with anamorphic projection lenses so that the height-to-width ratio of the projected images are restored to normal. If desired, the negative may be non-anamorphic and the necessary or desired degree of anamorphic effect given to the positive strips in the printer. The use of anamorphic lenses on the camera printer, or projector, or combinations thereof, gives flexibility to the process so that a wide range of height-to-width ratios of the projected image can be obtained from anamorphic or non-anamorphic negatives having film frames of various sizes and shapes.

Figure 12:
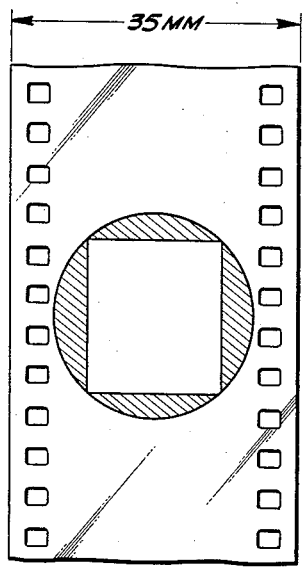
Figure 12 is a diagram showing light loss when projecting a rectangular film frame in which the height and width are almost equal.
Figure 13:
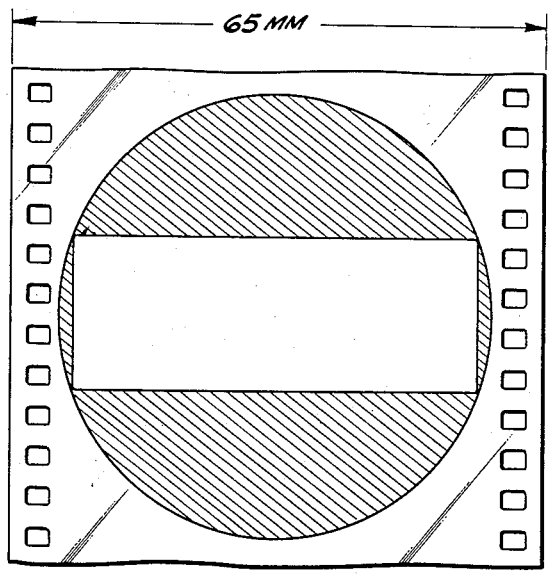
Figure 13 is a diagrammatic illustration showing the greater amount of light loss when the width of the film frame is tripled and illuminated from the same source.

Release prints which are wider than standard have been used in attempting to obtain satisfactory lighting on wide viewing screens. However, a comparison of Figures 12 and 13 shows that the proportion of light loss in projecting a relatively long and narrow frame is much greater than the amount lost in projecting three of the frames of the shape shown in Figure 12. The frame in Figure 13 is the same height, but three times as wide as the frame in Figure 12. The area represented by the cross-hatched space in Figure 12 is considerably more than three times the area of the cross-hatched space in Figure 13. Accordingly, the percentage of light loss is greater in a single projector with a film frame shape as in Figure 13 than with the three projectors each having a film frame shape as in Figure 12, assuming that the total amount of light supplying the three projectors is equal to the amount of light supplying the single projector. It will be understood, therefore, that a great deal more light is made effective on the viewing screen when using a plurality of projectors each producing a part of the total picture, as compared to a single projector operating with a wide elongated frame aperture.

Having fully described my invention, it is to be understood that I am not to be limited by the details herein set forth but that my invention is of the full scope of the appended claims.

I claim:

1. The method of producing upon a motion picture screen projected pictures of substantially greater width than height and appearing as single uninterrupted pictures each extending from one lateral border to the other, comprising the steps of: photographing a scene with a motion picture camera to obtain a series of pictures on a single relatively wide film strip, printing from said single wide film strip a first relatively narrow print strip to duplicate only a first lateral portion of each picture on said wide film strip, printing from said wide film strip a second relatively narrow print strip to duplicate a second lateral portion of each picture contiguous to said first portion and including also a small portion common thereto, the said common portion being located on the right margin of each picture portion which is on one of the print strips and on the left margin of each picture portion which is on the other print strip, simultaneously projecting said first and second print strips on a screen from separate projectors so that the picture portions on each print strip are independently illuminated on the screen and so that the features of said common portion projected from both print strips geometrically overlap in substantial registry to produce an overlap zone on the screen, and vignetting the edges of said common portion as projected to effect blending and merging of the overlap zone.

2. The method set forth in claim 1 in which an anamorphic lens system is employed in the camera to effect lateral compression of features of the picture on the wide film strip, and wherein a further degree of lateral compression is introduced into the picture portions on the print strips by the printing operation, and wherein the projectors are provided with anamorphic projection lenses for restoring on the screen the original width-to-height dimensions in the original scene.

3. The method set forth in claim 1 in which an anamorphic lens system is employed in the camera to effect lateral compression of features of the pictures on the wide film strip, and wherein the projectors are provided with anamorphic projection lenses for restoring on the screen the original width-to-height dimensions in the original scene.

4. The method of producing upon a motion picture screen projected pictures of substantially greater width than height and appearing as single uninterrupted pictures each extending from one lateral border to the other, comprising the steps of: printing from a single relatively wide film strip derived from a single motion picture camera a first relatively narrow print strip to duplicate only a first lateral portion of each picture on said wide film strip, printing from said wide film strip a second relatively narrow print strip to duplicate a second lateral portion of each picture contiguous to said first portion and including also a small portion common thereto, the said common portion being located on the right margin of each picture portion on one of the print strips and on the left margin of each picture portion on the other print strip, simultaneously projecting said first and second print strips on a screen from separate projectors so that the picture portions on each print strip are independently illuminated on the screen and so that the features of said common portion projected from both print strips geometrically overlap in substantial registry to produce an overlap zone on the screen, and vignettizing the edges of said common portion as projected to effect blending and merging of the overlap zone.

5. The method set forth in claim 4 in which three narrow print strips are printed from the single wide film strip, and are projected by three separate projectors to produce two overlap zones on the screen, and wherein the edges of both overlap zones are vignetted to effect blending and merging.

6. The method set forth in claim 4 in which the motion picture screen is translucent and wherein the projected pictures are photographed from the other side of the translucent screen by a motion picture camera operated in synchronism with the projectors.

References Cited in the file of this patent

UNITED STATES PATENTS

| | | |
|---|---|---|
| 545,423 | Chase | Aug. 27, 1895 |
| 1,294,686 | McCormick | Feb. 18, 1919 |
| 1,666,304 | Proctor | Apr. 17, 1928 |
| 1,808,352 | Hollen | June 2, 1931 |
| 1,829,634 | Chretien | Oct. 27, 1931 |
| 1,894,265 | Chretien | Jan. 17, 1933 |
| 1,942,748 | de Ybarrondo | Jan. 9, 1934 |
| 1,945,926 | Tolhurst | Feb. 6, 1934 |
| 2,198,815 | Haskin | Apr. 30, 1940 |
| 2,280,206 | Waller et al. | Apr. 21, 1942 |
| 2,544,116 | Waller et al. | Mar. 6, 1951 |
| 2,600,261 | Pennington | June 10, 1952 |
| 2,610,544 | Waller et al. | Sept. 16, 1952 |

FOREIGN PATENTS

| | | |
|---|---|---|
| 397,949 | France | May 21, 1909 |
| 1,096,994 | France | June 28, 1955 |